United States Patent [19]

Johnson

[11] Patent Number: 4,800,924

[45] Date of Patent: Jan. 31, 1989

[54] DIRECT DRIVE SERVOVALVE WITH ROTARY VALVE

[75] Inventor: Dennis D. Johnson, Mt. Clemens, Mich.

[73] Assignee: Davidson Textron Inc., Dover, N.H.

[21] Appl. No.: 42,036

[22] Filed: Apr. 24, 1987

[51] Int. Cl.[4] ............................................. F16K 11/085
[52] U.S. Cl. ............................. 137/625.23; 137/625.24
[58] Field of Search ..................... 137/625.24, 625.22, 137/625.23, 625.21; 251/129.11

[56] References Cited

U.S. PATENT DOCUMENTS

| | | | |
|---|---|---|---|
| 660,010 | 10/1900 | Ezell | 137/625.22 |
| 2,239,139 | 4/1941 | Allin | 137/625.22 |
| 4,546,338 | 10/1985 | Idogaki | 251/129.11 X |

Primary Examiner—Alan Cohan
Attorney, Agent, or Firm—John C. Evans

[57] ABSTRACT

An electrical force motor and servovalve combination has a rotary spool directly coupled to the motor shaft without requiring a rotary-to-linear motion convertor; the rotary spool is configured to have a cruciform metering section that cooperates with a flow sleeve having ports and slots configured to produce four-way flow patterns in a reduced length and volume valve package.

10 Claims, 2 Drawing Sheets

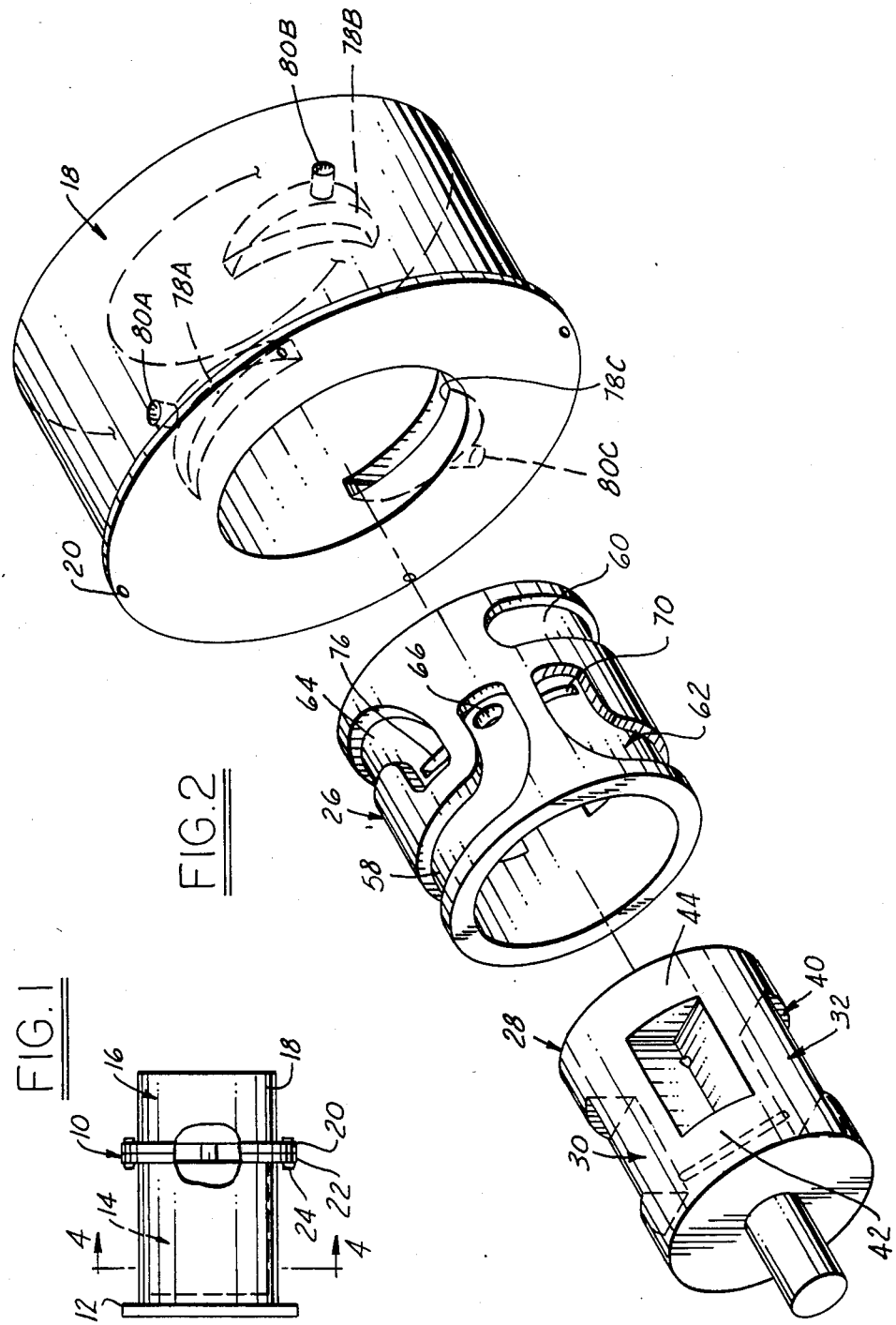

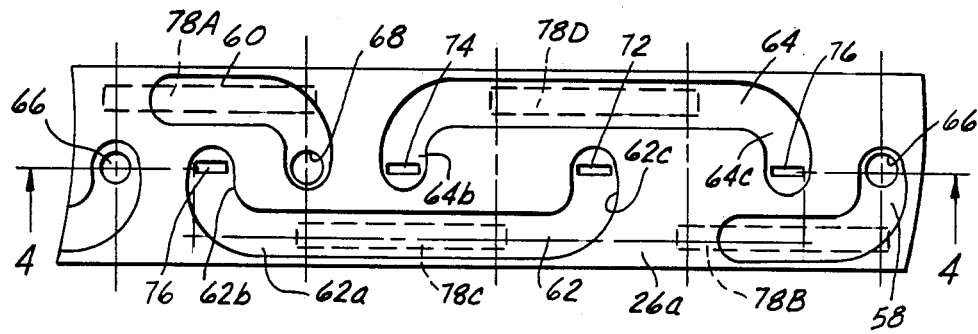

DIRECT DRIVE SERVOVALVE WITH ROTARY VALVE

FIELD OF THE INVENTION

The present invention relates to electrical force motor and servovalve combinations having a valve spool driven by a force motor and in particular to such units having rotary flow control valves directly coupled to a direct drive rotary motor.

BACKGROUND OF THE INVENTION

Force motors having a linearly movable coil with directly driven servovalves coupled thereto for controlling fluid flow on a hydraulic or fluid control system are set-forth in U.S. Pat. Nos. 4,530,487 and 4,560,967. Such combinations of drive motors and systems heretofore have required an intermediate rotary to linear motion conversion linkage.

SUMMARY OF THE INVENTION

The present invention provides an electrical rotary coil force motor and valve combination that includes a rotary valve configured for direct coupling to the output shaft of the coil force motor to eliminate prior intermediate rotary to linear motion conversion linkage. In a typical working embodiment of the invention an electrical rotary coil force motor of the type which is set-forth in copending U.S. application Ser. No. 879,702 filed June 27, 1986 in the name of Dale Johnson and Sidney Tew for Rotary Force Motor and Direct Drive Servovalve has its output shaft coupled by a rotary-to-linear conversion linkage to a four-way spool valve assembly that is adaptable for use in either a single or multiple channel hydraulic control system.

In the present invention the shaft of the rotary motor is connected to a rotary valve to eliminate the need for an intermediate rotary to linear motion conversion linkage as is conventioonally done. The resultant package is smaller, lighter and more reliable and less costly than heretofore used direct drive valve packages.

In a preferred embodiment of the invention, the valve assembly includes a valve spool and sleeve made of hardened alloy or stainless steel. The valve spool is lap fit into the sleeve with diametrical clearances of the same order of those found in conventional linear spool type flow control valves.

The valve spool is rotated with respect to the normal flow passages of a four-way valve which are located in the valve housing. The spool valve further includes a metering portion which in cross-section is cruciform in shape. Pressure metering occurs at lands located at predetermined angular positions on the sleeve and return metering occurs at other angular positions thereon. Control flow originates at other angular positions and are interconnected by a pair of cross drilled holes in the spool. The spool is rotatable by the direct drive motor so that pressure ports or slots are opened to a first source of control pressure and return ports or slots are opened to a second source of control pressure. The converse is true when the valve is rotated in an opposite direction. Thus, the rotatable spool will serve to perform functions presently found in four-way flow control valves of the linear spool type.

The present invention also provides a sleeve having no elastomeric seals, the sleeve being shrink fitted into a valve body of similar thermal expansion characteristics. Pressure flow entering the sleeve occurs at two diametrically opposed locations as does the flow to return ports. The return ports and pressure ports are interconnected by the valve body or by means of machined passages in the sleeve itself. Because the ports and flow action is symmetric, the valve spool is pressure balanced in all radial directions.

The present invention further provides a scallop cut in each quadrant of the valve body each of which connects drilled passages within the valve body to an appropriate port on the valve body mounting face. The sleeve grooves can thus be located at the same position axially of the sleeve thereby.

The present invention further includes lap fitting of the spool to the sleeve in the same manner as the case of prior linear valve spool and sleeve configurations. The final processing of the lands are specially configured to provide proper flow lap conditions upon relative movement of the valve with respect to the sleeve.

An object of the present invention is to provide an improved direct drive motor driven rotary valve for use in fluid control systems, including rotary valve components which are configured to simplify motor valve interface couplings and to provide a valve spool radius which is reduced to increase chip shear forces and reduce valve breakaway thresholds without sacrificing output flow linearity.

Another object of the present invention is to provide and improved direct drive valve and electrical rotary coil force motor combinations which include an increased valve stroke and an increased rate of flow and reduced threshold effects without sacrificing output flow linearity.

Yet another object of the present invention is to provide an improved electrical rotary coil force motor and rotary valve combination in which valve spool means are configured to provide a bearing for a motor armature thereby to simplify motor/valve alignment and connection so as to reduce the total number of parts in the assembly.

Yet another object of the present invention is to provide four scallops in the valve body of a rotary valve unit driven by an electrical rotary coil force motor; the scallops being located at diametrically opposed positions in the valve body and at the same position along the length of the sleeve, one scallop for each port of the four-way valve. The four scallops are in two sets of two. The two scallops per each set are diametrically opposed and the two sets are 90° apart and axially located at different positions along the body bore length. This allows the sleeve length to be about half that of a conventional linear spool valve for the same rated output flow so as to reduce weight and size of the system.

Yet another object of the present invention is to provide an improved electrical rotary coil force motor and driven rotary valve combination which includes means for coupling the force motor output and the input to the rotary valve so as to eliminate the need for an intermediate rotary to linear motor conversion linkage; and a final object is to provide a system of the aforesaid type wherein the spool of the valve is of a reduced length in comparison to linear spool valve configurations thereby requiring less motive force to move the valve into its respective control positions and to thus reduce the weight by requiring a smaller motor to meet the same performance parameters as in a comparable linear valve type spool system.

A further object is to provide valves of the aforementioned type which are constructed to be gained and synchronized together axially to provide multiple hydraulic channels similar to linear valve concepts.

BRIEF DESCRIPTION OF THE DRAWINGS

The foregoing and other objects, features and advantages of the invention will be apparent from the following detailed description of a preferred embodiment of the invention when taken in conjunction with the accompanying drawings wherein:

FIG. 1 is an elevation view, partially sectioned, of a direct drive servovalve made in accordance with the present invention;

FIG. 2 is an exploded perspective view of a rotary valve in the servovalve shown in FIG. 1;

FIG. 3 is a developed view of a sleeve component of the rotary valve shown in FIG. 2;

FIG. 4 is a sectional view taken along the line 4—4 of FIG. 1 looking in the direction of the arrows showing the sleeve in its assembled disposition;

FIG. 5 is a view like FIG. 4 showing the spool of the valve in a second control position; and FIG. 6 is a sectional view taken along the line 6—6 of FIG. 4 looking in the direction of the arrows.

DESCRIPTION OF THE PREFERRED EMBODIMENT

FIGS. 1-6 illustrate a direct drive servovalve constructed in accordance with the present invention. The servovalve includes a housing or casing 10 having mounting brackets 12 for use in mounting the servovalve on a support.

Disposed cooperatively in the housing 10 is a limited angle or rotation force (torque motor 14) of the type set-forth more specifically in copending U.S. application Ser. No. 879,702 filed June 27, 1986 in the name of Dale Johnson and Sidney Tew for Rotary Force Motor and Direct Drive Servovalve. The details of the motor set forth in the application are assigned to a common assignee and are incorporated by reference in this specification.

The housing 10 further includes a single four-way hydraulic rotary valve 16 constructed in accordance with the present invention. More specifically the rotary spool valve 16 includes a valve body 18 having a plurality of coupling ears 20 thereon that are connected to the motor 14 at coupling ears 22 thereon by suitable fastening means such as screws 24. The valve 18 further includes a ported sleeve 26. The ported sleeve 26 is associated with a rotatable valve spool 28 which is recessed in a manner to provide a four-way valve function in cooperation with the portion on the sleeve 26. Both the valve spool 28 and the sleeve 26 can be made of hardened alloy or stainless steel, for example, 440C stainless steel. The valve spool 28 is lap fit into the sleeve 26 with diametrical clearances therebetween comparable to those found in conventional spool type linear flow control valves.

As best illustrated in FIGS. 2 and 4, the spool valve 28 includes a cruciform shape defined by axially directed ribs 30,32,34,36. Each of the ribs includes a curvilinear outer land 30a, 32a, 34a and 36a, respectively thereon which has the same radius as that of the inside diameter surface 38 of the sleeve 26. A cruciform metering portion 40 defined thereby is configured so that pressure metering occurs at the curvilinear lands 32a and 36a located at the 3 and 9 o'clock positions shown in FIG. 4 and return metering occurs at the lands 30a and 34a located at the 6 and 12 o'clock positions shown in FIG. 4.

The cruciform section 40 of the spool 28 is formed only in the center of the spool length and opposite ends of the spool 28 are as complete circumference lapped fit land regions 42,44 with respect to the inside diameter of the sleeve 26 to prevent excessive leakage from the center cruciform flow control section 40 of the spool 28 through the ends of the spool and adjacent channels therein.

The center cruciform section 40 of the spool 28 further includes first and second drill passages C2 regions 46 and 48. Passage 48 communicates pressure flow control, 50,52 at diametrically opposed points on the cruciform metering section. Passage 46 communicates like pressure flow control C1 regions 54,56 at diametrically located points on the cruciform section 40 at points 180° out of phase with the regions 50,52.

The flow control passages in the sleeve 26 include a control pressure groove 58 constituting control pressure C2. It further includes a control pressure groove 60 constituting control pressure C1 and it further includes a groove 62 constituting the pressure groove of the sleeve 26. Finally, the sleeve 26 includes a groove 64 defining the reservoir or return pressure source in the sleeve 26.

The control pressure groove 58 includes a port 66 therein which is located at the 1:30 position in FIG. 4. The groove 60 includes a C1 port 68 which is located at the 4:30 low position shown in FIG. 4. The cross-passage 48 constitutes a through passage for communicating the pressure C2 to the opposite side of the cruciform metering section 40 into pressure region 52 and the cross-passage 46 constitutes a passage for putting the control pressure C1 from the port 68 into the pressure region 54.

The pressure groove 62 has a metering port 70 in communication therewith which s formed through the sleeve at the 3 o'clock position in FIG. 4. The groove 62 further includes a second pressure metering port 72 located at the 9 o'clock position in FIG. 5.

Thus, the groove 62 has an arcuate segment 62a wrapped 180 degrees around the sleeve 26 on a circle segment of the outer circumferential surface 26a thereof. the segment 62a thereby serves to communicate diametrically opposite first and second pressure metering slots 70, 72 of the four way control valve so that pressurized fluid from inlet port 80C will be directed to one or the other of the control ports 66, 68 depending upon the valve control position of the spool 28. The wrapped segment 62a is aligned with a scallop 78C which is communicated with the fluid pressure source inlet port 80C. The wrapped segment 62a has offset end segments 62b and 62c which serve, respectively, to communicate scallop 78C (and the pressure source) with pressure metering slots 70, 72.

The return groove 64 likewise has a return pressure metering port 74 in communication therewith formed through the sleeve at the 12 o'clock position. A second return metering port 76 is in communication with a groove 64 and formed through the sleeve at the 6 o'clock position as shown in FIG. 5.

Thus, the groove 64 has an arcuate segment 64a wrapped 180 degrees around the sleeve 26 on a circle segment of the outer circumferential surface 26a thereof at a point thereon axially spaced from the arcuate segment 62a. The segment 64a thereby serves to communicate diametrically opposite first and second exhaust or return metering slots 74, 76 of the four way control valve so that the system return will be communicated with one or the other of the control ports 66, 68 depending upon the control position of the spool 28. the wrapped segment 64a is aligned with scallop 78D. Segment 64a is joined at its ends to offset end segments 64b and 64c which serve, respectively, to communicate scallop 78D with metering slots 74, 76.

As seen in FIG. 3, the metering slots 70, 72 in sleeve 26 are formed on the same line as return or exhaust metering slots 74, 76 therein. The control pressure ports 66, 68 in sleeve 26 are formed on the same line. This alignment of metering slots and control pressure ports defines a sleeve passage system which is compactly coupled by the aforedescribed system of grooves 58, 60, 62, 64 for directing flow from a pressure source, modulating it in accordance with the position of spool 28 by use of the pressure metering slots 70, 72 and directing it to one or the other of two control points. The two control points are likewise selectively connected to the return of a hydraulic system via return metering slots 74, 76.

Since pressure flow enters the sleeve 26 at two locations which are diametrically opposed, the two pressure ports must be communicated by the arcuately formed passage 62. This is also the case for return flow communicated by passage 64. This sleeve location of the pressure ports is preferable from the standpoint of minimizing the weight and size of the valve body in accordance with one of the objectives of the invention.

Centrally located with each quadrant of the valve is a scallop 78A, 78B, 78C, 78D cut in the valve body 18. Each scallop is connected with a valve port 80A, 80B, 80C, 80D as shown in FIG. 4. Port 80A is a control pressure, C2, port in communication with scallop 78A; port 80B is a control pressure, C1, port in communication with scallop 78B; port 80C is a pressure source port in communication with scallop 78C and port 80D is a return port in communication with the scallop 78D. The grooves 58, 60, 62, 64 which are cut on the outside of the sleeve 26 as shown in FIG. 2, are communicated with appropriate ports in the sleeve and the aforedescribed scallop cuts 78A–D in the body 18. The grooves are preferably cut with either a numerically controlled mill with a sleeve mounted on a rotary spindle or a programmable EDM machine. Further the metering slots 70, 72, 74, 76 are preferably also formed by EDM processes for metering accuracy. The utilization of common processes to cut the grooves and the slots in the sleeve 26 require fewer set-ups in the manufacturing of the valving components. The depth of each of the grooves is selected to provide a desired flow area through the valve. Lap fitting of the spool 28 to the sleeve 26 can be accomplished as in the case of linear spool valve and sleeve combinations. However, in the final processing of the lands 30a–36a proper overlaps or underlaps must be established to achieve proper flow lap conditions to carry out the functions of the valves to be described.

VALVE FUNCTION

When the limited angle rotary force motor is energized as described in the aforedescribed copending U.S. Patent application Ser. No. 879,702, the spool 28 is rotated clockwise as viewed in FIGS. 4 and 5. From a position in FIG. 4 where all of the lands 30a, 32a, 34a, and 36a are positioned to close all of the valve metering slots 70, 72, 74, and 76 thence all the ports 80A-80D, are closed. The spool 28 is initially rotated clockwise from the position shown in FIG. 4 to the position shown in FIG. 5. Consequently the pressure metering slots 70, 72 are open to the pressure C2 at the port 66 and the return metering slots 74, 76 are open to the pressure C1 at port 68. The converse is true when the valve spool 28 is rotated in the counterclockwise direction. Thus the valve functions as a four-way flow control valve.

Because of the symmetric location of the ports and the symmetric actions of the flow through the valve, the valve is optimally pressure balanced in all radial directions. The limitation of the controlling function within the center half of the spool length, as previously described, will prevent excessive leakage from the ends of the valve spool during its operation.

The sleeve 26 has no elastomeric seals therein and is shrink fitted into the body 18 which is a material with similar thermal expansion characteristics to that of the sleeve 26. Since the pressure flow enters the sleeve 26 at slots 70 and 72 which are at diametrically opposed positions the two pressure ports are interconnected by the groove 62. Likewise the return ports 74, 76 are intercommunicated by the groove 64. The provision of the grooves in the sleeve enable the weight and size of the body to be reduced.

The drill passages 46, 48 correctly connect each of the scallops 78A to 78D through the appropriate port 80A through 80D located on the valve body exterior.

By virtue of this arrangement the valve spool 28 serves as a bearing for a simply supported motor armature to simplify the need for motor valve alignment. The valve stroke through the rotary angular positioning of spool 28 is accomplished without resort to rotary-to-linear motion conversion devices. The use of a reduced length requires less motor force. Hence, lower weight motors can be used for a given flow rating. The improved valve configuration thus contributes to significant weight and volume reductions in various applications of the inventive concept.

I claim:

1. In a motor driven four-way valve assembly including a drive motor connected to a rotary spool having lands thereon moveable with respect to metering passages for modulating pressure from a pressure source port in the valve housing to first and second control ports and for modulating pressure flow from the control ports to a return port the improvement comprising:

a circular sleeve in said valve housing rotatably supporting the rotary spool and having a pair of pressure metering passages and having a pair of return metering passages;

means for directing pressure to said pressure metering passages including a first groove formed in the outer circumference of said circular sleeve, means for returning pressure flow from said return metering passages including a second groove formed in the outer circumference of said circular sleeve, said first and second grooves each having an arcuate segment formed on a circle segment of said sleeve; said first and second grooves having spaced offset end segments therein communicating respectively with said pair of pressure metering passages and with said pair of return metering passages to equalize radial pressure on the rotary spool for reducing the force required to rotate the rotary spool with respect to the circular sleeve.

2. In the combination of claim 1, a valve housing surrounding said circular sleeve, said valve housing including inlet means and outlet means, means including equally angularly spaced scallops in said valve housing for communicating said grooves with said inlet and outlet means.

3. In the combination of claim 2, said inlet and outlet means defining four-way valve passages.

4. In the combination of claim 2, said scallops being located at spaced axial positions on said valve housing.

5. In the combination of claim 1, the rotary spool including a cruciform metering section and spaced circumferential sealing lands on either end of said cruciform metering section, said circular sleeve diametrically engaging said sealing lands for sealing opposite ends of the rotary spool as it is rotated with respect to the valve housing.

6. In the combination of claim 5, said cruciform metering section including angularly spaced ribs each having a metering land moveable with respect to one of said metering passages to modulate pressure flow therethrough;

said circular sleeve further including first and second control pressure ports therein for receiving modulated pressure flow from said metering passages;

said metering passages and said control pressure ports being formed on the same arcuate segment of a circle on the outer circumference of said circular sleeve.

7. In the combination of claim 6, said angularly spaced ribs defining a first pair of diametrically spaced modulated pressure regions and further defining a second pair of diametrically spaced modulated pressure regions;

a first cross passage formed through said spool for communicating said first pair of diametrically spaced modulated pressure regions and a second cross passage formed through said spool for communicating said second pair of modulated pressure regions for pressure balancing the rotary spool in a radial direction.

8. In the combination of claim 1, a valve housing surrounding said circular sleeve, said valve housing including a pressure port and a return port, and means including scallops formed as spaced semicircular openings in said valve housing formed to connect to said pressure port and return port and to communicate with said sleeve grooves to complete a fluid path from said pressure and return ports to said metering passages.

9. In the combination of claim 8, said scallops being located at spaced axial positions on said valve housing.

10. In a motor driven four-way valve assembly having a drive motor connected to a rotary spool having lands thereon moveable with respect to metering means for modulating pressure from a pressure source pot in the valve housing to first and second control ports and for modulating pressure flow from the control ports to a return port the improvement comprising:

a circular sleeve in said valve housing rotatably supporting the rotary spool and having a first pair of pressure metering passages and having a second pair of return metering passages;

means for directing pressure to said metering passages including overlapping grooves formed in the outer circumference of said circular sleeve, said overlapping grooves each having an arcuate segment formed on a circle segment of said sleeve; said overlapping grooves each having spaced offset end segments therein communicating with said metering passages to produce an equalized radial pressure on the rotary spool for reducing force required to rotate the rotary spool with respect to said circular sleeve.

* * * * *